United States Patent [19]

Buchman

[11] Patent Number: 5,904,386
[45] Date of Patent: May 18, 1999

[54] BUMPER PROTECTOR

[76] Inventor: Darren Buchman, 1453 E. 101st St., Brooklyn, N.Y. 11236

[21] Appl. No.: 08/851,212

[22] Filed: May 5, 1997

[51] Int. Cl.[6] .................................................. B60R 19/44
[52] U.S. Cl. ........................................... 293/142; 293/136
[58] Field of Search ..................... 293/142, 136; 267/292, 140, 139; D08/402

[56] References Cited

U.S. PATENT DOCUMENTS

| | | | |
|---|---|---|---|
| D. 251,509 | 4/1979 | Wenrick | D25/75 |
| D. 275,475 | 9/1984 | Turkleson | D12/169 |
| 1,681,069 | 11/1928 | Theodoropulos | 293/142 |
| 1,930,189 | 10/1933 | Barbara | 293/142 |
| 3,014,710 | 12/1961 | Layne | 267/140 |
| 3,056,620 | 10/1962 | Adams et al. | 293/142 |
| 3,081,993 | 3/1963 | Wallerstein, Jr. | 267/292 X |
| 4,218,807 | 8/1980 | Snow | 16/86 A |
| 5,233,724 | 8/1993 | Leitert et al. | 16/86 A |
| 5,246,214 | 9/1993 | Wolf et al. | 267/153 |
| 5,419,539 | 5/1995 | Bressler | 267/292 |
| 5,782,461 | 7/1998 | Gwinn | 267/140 |

*Primary Examiner*—D. Glenn Dayoan
*Assistant Examiner*—Jason Morrow
*Attorney, Agent, or Firm*—Richard L. Miller

[57] ABSTRACT

A bumper protector that protects a bumper of a vehicle while functioning as a license plate fastener. The protector includes a portion, a band, and a screw. The portion is resilient and provides impact protection for the bumper of the vehicle. The band is disposed around the portion and prevents the portion from bursting when the portion is impacted upon. The screw is disposed through the portion and replaceably fastens the license plate to the bumper of the vehicle.

10 Claims, 1 Drawing Sheet

BUMPER PROTECTOR

BACKGROUND OF THE INVENTION

1. Field of the Invention

The present invention relates to a protector. More particularly, the present invention relates to a bumper protector.

2. Description of the Prior Art

Numerous innovations for protectors have been provided in the prior art that will be described. Even though these innovations may be suitable for the specific individual purposes to which they address, however, they differ from the present invention.

For example, U.S. Pat. No. Des. 251,509 to Wenrick teaches the ornamental design for a trim strip adapted to be secured to an automobile bumper or body.

Another example, U.S. Pat. No. Des. 275,475 to Turkleson teaches the ornamental design for an automobile bumper guard.

Still another example, U.S. Pat. No. 4,218,807 to Snow teaches a door stop and method which insures damping of the inertia of a swinging door without damage to either the door or the door stop. The door stop comprises a static member mounted to a wall or a door and a dynamic member having a hollow body which reciprocally receives guide structure of the static member. The dynamic member also comprises a bumper which upon engagement with the door or the wall causes reciprocation of the two members.

Yet another example, U.S. Pat. No. 5,233,724 to Lei tert et al. teaches a cushioned stop member for attachment to a sliding panel for limiting movement of that panel relative to opposed abutment surfaces on a similar panel. This allows a series of sliding panels to be used in self aligning manner. The stop member has a base part with a flat surface suitable for securement to a flat surface of the sliding panel and retaining elements projecting outwardly from the base part. These retaining elements hold a resilient cushioning member which is an interference fit on the retaining elements and which has opposed side surfaces which can engage on the opposed abutment surfaces of the other panel in a cushioned manner.

Still yet another example, U.S. Pat. No. 5,246,214 to Wolf et al. teaches a rubber block shaped as a segment of a circular washer wherein opposite ends of the segment are surfaces against which torsional forces are applied to the blocks. A plurality of hollow ducts extend through the block and all the ducts are parallel to each other and essentially perpendicular to a main plane of the block. The main plane is perpendicular to the load bearing surfaces. The hollow ducts are intersected by cavities having cross-sectional areas larger than the corresponding cross-sectional areas of the ducts intersecting these cavities.

Yet still another example, U.S. Pat. No. 5,419,539 to Bressler teaches an elastic bumper assembly for an automotive vehicle or the like, which comprises an elastic bumper member adapted for repetitive cushioning impact, the elastic bumper member being formed of an elastomeric material, which contains imbedded therein a relatively stiff high strength insert member, with the insert member having a fastener device extending outwardly therefrom, and a cuplike holder member adapted to receive and hold one end of the bumper member which has the insert member and fastener protruding therefrom, such that the fastener member protrudes through the holder member and is then securely attached to a supporting position on the automotive vehicle axle or frame.

It is apparent that numerous innovations for protectors have been provided in the prior art that are adapted to be used. Furthermore, even though these innovations may be suitable for the specific individual purposes to which they address, however, they would not be suitable for the purposes of the present invention as heretofore described

SUMMARY OF THE INVENTION

Accordingly, an object of the present invention is to provide a bumper protector that avoids the disadvantages of the prior art.

Another object of the present invention is to provide a bumper protector that is simple and inexpensive to manufacture.

Still another object of the present invention is to provide a bumper protector that is simple to use.

Briefly stated, yet another object of the present invention is to provide a bumper protector that protects a bumper of a vehicle while functioning as a license plate fastener. The protector includes a portion, a band, and a screw. The portion is resilient and provides impact protection for the bumper of the vehicle. The band is disposed around the portion and prevents the portion from bursting when the portion is impacted upon. And, the screw is disposed through the portion and replaceably fastens the license plate to the bumper of the vehicle. The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
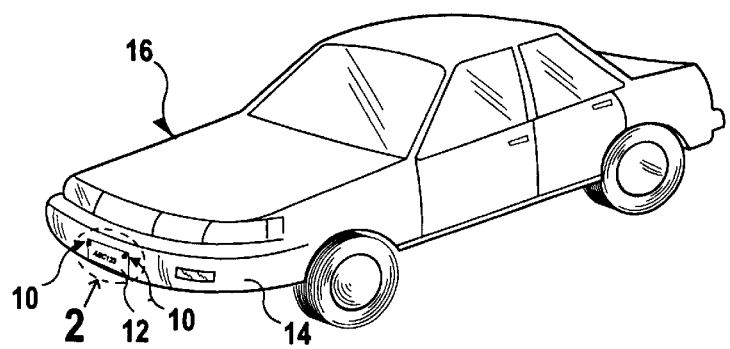
FIG. 1 is a diagrammatic perspective view of the present invention being utilized to attach a license plate to the front bumper of a vehicle.

LIST OF REFERENCE NUMERALS UTILIZED IN THE DRAWING 10 bumper protector of the present invention 12 license plate 14 front bumper 14 of vehicle 16

16 vehicle 18 portion 20 front face of portion 18

22 rear face of portion 18

24 longitudinal axis of portion 18

25 exterior surface of portion 18

26 throughbore in portion 18

28 first portion of throughbore 26 in portion 18

30 second portion of throughbore 26 in portion 18

34 third portion of throughbore 26 in portion 18
36 band
38 screw
40 head of screw 38

DETAILED DESCRIPTION OF THE PREFERRED EMBODIMENT

Figure 2:
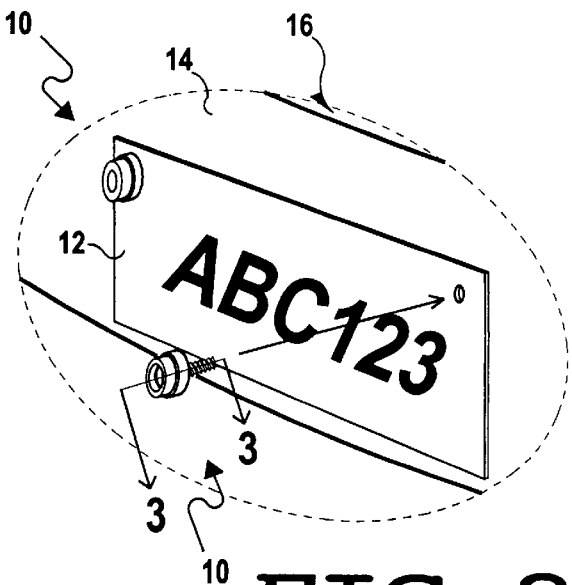
FIG. 2 is an enlarged diagrammatic perspective view of the area generally enclosed by the dotted ellipse identified by arrow 2 in FIG. 1.

Referring now to the figures in which like numerals indicate like parts, and particularly to FIGS. 1 and 2, the bumper protector of the present invention is shown generally at 10 being utilized to attach a license plate 12 to a front bumper 14 of a vehicle 16, while protecting the front bumper 14 of the vehicle 16 from impact.

Figure 3:
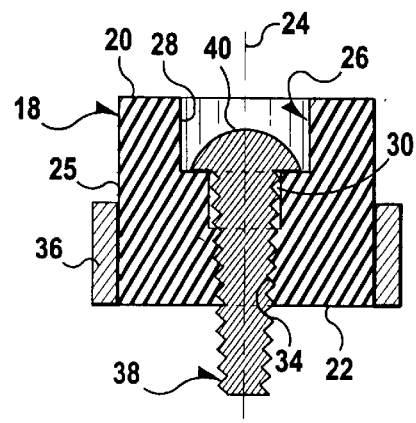
FIG. 3 is an enlarged cross sectional view taken o line 3—3 in FIG. 2.
Figure 4:
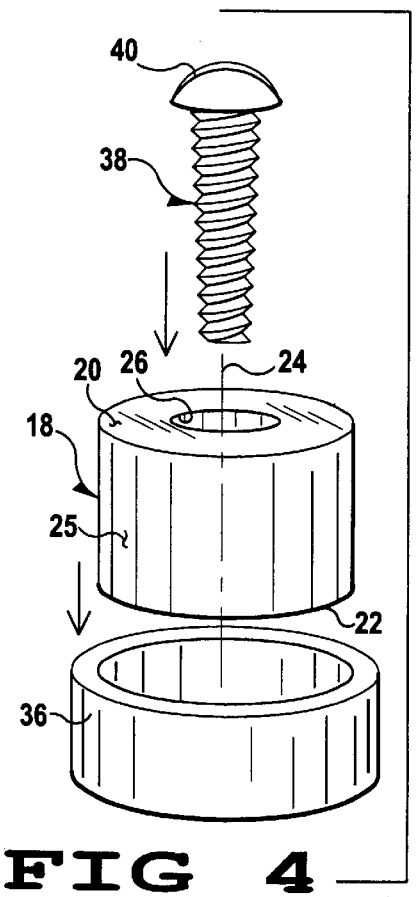
FIG. 4 is an enlarged exploded diagrammatic perspective view of the present invention.

The configuration of the bumper protector 10 can best be seen in FIGS. 3 and 4, and as such will be discussed with reference thereto.

The bumper protector 10 includes a portion 18 that is resilient rubber and circular-cylindrically-shaped. The portion 18 has a front face 20, a rear face 22 that is displaced rearwardly of, and parallel to, the front face 20 of the portion 18, a longitudinal axis 24, and an exterior surface 25.

The portion 18 further has a throughbore 26 that is specifically configured and extends longitudinally therethrough, from the front face 22 of the portion 18 to the rear face 22 of the portion 18.

The throughbore 26 in the portion 18 includes a first portion 28 that has a depth, a diameter, and extends longitudinally from, and opens into, the front face 20 of the portion 18, to partially into the portion 18.

The throughbore 26 in the portion 18 further includes a second portion 30 that has a diameter less than, and is coaxial with, the first portion 28 of the throughbore 26 in the portion 18, and extends longitudinally therefrom.

The throughbore 26 in the portion 18 further includes a third portion 34 that has a diameter less than, and is coaxial with, the second portion 30 of the throughbore 26 in the portion 18, and extends longitudinally therefrom, and opens into the rear face 22 of the portion 18.

The bumper protector 10 further includes a band 36 that is steel, circular-cylindrically-shaped, disposed coaxially against the exterior surface 25 of the portion 18, extends therealong from, and flush with, the rear face 22 of the portion 18, to short of the first portion 28 of the throughbore 26 in the portion 18, and prevents the portion 18 form bursting when the front face 20 of the portion 18 is impacted upon.

The bumper protector 10 further includes a screw 38 that has a diameter and a head 40 and replaceably threads the bumper protector 10 into the bumper 14 of the vehicle 16. The screw 38 extends into the portion 18, with the head 40 of the screw 38 resting in the first portion 28 of the throughbore 26 in the portion 18, and with the screw 38 extending through the second portion 30 and the third portion 34 of the throughbore 26 in the portion 18, and out past the rear surface 22 of the portion 18.

The head 40 of the screw 38 has a diameter and a height that is less than the diameter and the height of the first portion 28 of the throughbore 26 in the portion 18 so as to allow the head 40 of the screw 38 to be recessed in the portion 18.

A portion of the screw 38 extending through the second portion 30 of the throughbore 26 in the portion 18 has a diameter equal to the diameter of the second portion 30 of the throughbore 26 in the portion 18 so as to allow the screw 38 to pass freely therethrough.

Another portion of the screw 38 extending through the third portion 34 of the throughbore 26 in the portion 18 has a diameter slightly greater than the diameter of the third portion 34 of the throughbore 26 in the portion 18 so as to allow the screw 38 to thread therein.

It will be understood that each of the elements described above, or two or more together, may also find a useful application in other types of constructions differing from the types described above.

While the invention has been illustrated and described as embodied in a bumper protector, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A bumper protector, comprising:

a) a portion being resilient; said portion being circular-cylindrically-shaped; said portion having a front face, a rear face being displaced rearwardly of, and parallel to, said front face of said portion, a longitudinal axis, and an exterior surface; said portion further having a throughbore extending longitudinally therethrough from said front face of said portion to said rear face of said portion; said throughbore in said portion including a first portion having a depth, a diameter, and extending longitudinally from, and opening into, said front face of said portion, to partially into said portion;

b) a band disposed around said portion; said band being circular-cylindrically-shaped, disposed coaxially against said exterior surface of said portion, extending therealong from, and flush with, said rear face of said portion, to short of said first portion of said throughbore in said portion, and preventing said portion form bursting when said front face of said portion is impacted upon; and c) a screw disposed in said portion.

2. The protector as defined in claim 1, wherein said portion is rubber.

3. The protector as defined in claim 1, wherein said throughbore in said portion further includes a second portion that has a diameter less than, and is coaxial with, said first portion of said throughbore in said portion, and extends longitudinally therefrom.

4. The protector as defined in claim 3, wherein said throughbore in said portion further includes a third portion that has a diameter less than, and is coaxial with, said second portion of said throughbore in said portion, and extends longitudinally therefrom, and opens into said rear face of said portion.

5. The protector as defined in claim 1, wherein said band is steel.

6. The protector as defined in claim 4, wherein said screw has a diameter and a head.

7. The protector as defined in claim 6, wherein said screw extends into said portion, with said head of said screw resting in said first portion of said throughbore in said portions and with said screw extending through said second portion and said third portion of said throughbore in said portion, and out past said rear surface of said portion.

8. The protector as defined in claim 6, wherein said head of said screw has a diameter and a height that is less than said diameter and said height of said first portion of said throughbore in said portion so as to allow said head of said screw to be recessed in said portion.

9. The protector as defined in claim 7, wherein a portion of said screw extending through said second portion of said throughbore in said portion has a diameter substantially equal to said diameter of said second portion of said throughbore in said portion so as to allow said screw to pass freely therethrough.

10. The protector as defined in claim 9, wherein another portion of said screw extending through said third portion of said throughbore in said portion has a diameter slightly greater than said diameter of said third portion of said throughbore in said portion so as to allow said screw to thread therein.

* * * * *